United States Patent
Delaby

(10) Patent No.: US 11,022,177 B2
(45) Date of Patent: Jun. 1, 2021

(54) SLEWING BEARING WITH SEALING ARRANGEMENT

(71) Applicant: Aktiebolaget SKF, Gothenburg (SE)

(72) Inventor: Juliette Delaby, Charentenay (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/287,048

(22) Filed: Feb. 27, 2019

(65) Prior Publication Data

US 2019/0323551 A1 Oct. 24, 2019

(30) Foreign Application Priority Data

Apr. 24, 2018 (DE) ...................... 10 2018 206 244.7

(51) Int. Cl.
*F16C 33/78* (2006.01)
*F16C 19/18* (2006.01)

(52) U.S. Cl.
CPC .......... *F16C 33/7896* (2013.01); *F16C 19/18* (2013.01); *F16C 33/783* (2013.01); *F16C 33/7823* (2013.01); *F16C 33/7866* (2013.01); *F16C 2300/14* (2013.01)

(58) Field of Classification Search
CPC .... F16C 33/72; F16C 33/7816; F16C 33/782; F16C 33/7823; F16C 33/783; F16C 33/784; F16C 33/7859; F16C 33/7866; F16C 33/7876; F16C 33/7879; F16C 33/7886; F16C 33/7896; F16C 2300/14; F16C 33/7889; F16J 15/3248; F16J 15/3252; F16J 15/3268; F16J 15/32; F16J 15/3204; F16J 15/3216; F16J 15/322

See application file for complete search history.

(56) References Cited

U.S. PATENT DOCUMENTS

| 2,945,730 A | * | 7/1960 | Murray | ............... F16C 33/7889 |
| | | | | 384/480 |
| 3,902,726 A | | 9/1975 | Hisada | |
| 4,770,424 A | | 9/1988 | Otto | |
| 4,787,758 A | * | 11/1988 | Jacob | ...................... F16C 19/26 |
| | | | | 29/898.062 |
| 5,908,249 A | | 6/1999 | Nisley et al. | |

(Continued)

FOREIGN PATENT DOCUMENTS

| CN | 204253631 U | 4/2015 |
| CN | 204327768 U | 5/2015 |

(Continued)

OTHER PUBLICATIONS

Machine Translation of WO 2018185288.
Machine Translation of DE 102011011165.

*Primary Examiner* — James Pilkington
(74) *Attorney, Agent, or Firm* — Garcia-Zamor Intellectual Property Law; Ruy Garcia-Zamor; Bryan Peckjian

(57) ABSTRACT

A slewing bearing providing a first ring, a second ring, the first and second rings being in relative rotation around a rotation axis, and at least one row of rolling elements arranged between the rings. The slewing bearing is further provided with a sealing device including at least one seal having an annular heel fixed to the first ring, and a sealing lip in sliding frictional contact with the second ring, and a deflector mounted to a lateral surface of second ring and having a deflecting part that at least partially radially surrounds the sealing lip.

15 Claims, 3 Drawing Sheets

(56) References Cited

U.S. PATENT DOCUMENTS

| | | | |
|---|---|---|---|
| 8,212,372 B2 | 7/2012 | Fujioka | |
| 9,022,663 B2 | 5/2015 | Palmer | |
| 9,334,901 B2 | 5/2016 | Schröppel | |
| 9,644,679 B2 | 5/2017 | Delaby et al. | |
| 9,751,576 B2* | 9/2017 | Suzuki | F16J 15/3256 |
| 9,810,266 B2* | 11/2017 | Capoldi | F16C 33/7896 |
| 2002/0126926 A1 | 9/2002 | Ohtsuki | |
| 2004/0228556 A1 | 11/2004 | Ohtsuki et al. | |
| 2012/0098209 A1 | 4/2012 | Siegfriedsen | |
| 2013/0039611 A1 | 2/2013 | Russ | |
| 2015/0267061 A1 | 9/2015 | Huesmann | |
| 2016/0059950 A1 | 3/2016 | Kortelainen | |
| 2016/0108966 A1* | 4/2016 | Krebs | F16C 33/805 384/480 |
| 2016/0265594 A1 | 9/2016 | Capoldi | |
| 2016/0327097 A1 | 11/2016 | Russ | |
| 2016/0341316 A1 | 11/2016 | Baumann | |
| 2019/0323559 A1 | 10/2019 | Delaby et al. | |

FOREIGN PATENT DOCUMENTS

| | | |
|---|---|---|
| CN | 204692541 U | 10/2015 |
| CN | 105464882 A | 4/2016 |
| CN | 207122580 U | 3/2018 |
| CN | 108278275 A | 7/2018 |
| DE | 10259400 A1 | 7/2004 |
| DE | 102011011165 A1 | 8/2012 |
| DE | 10201521756 A1 | 3/2017 |
| DE | 102015217561 A1 | 3/2017 |
| EP | 0458122 A2 | 11/1991 |
| EP | 2722544 A1 | 4/2014 |
| EP | 2993123 A1 | 3/2016 |
| EP | 3048319 A1 | 7/2016 |
| FR | 2595776 A1 | 9/1987 |
| FR | 2694610 A1 | 2/1994 |
| FR | 3025008 A1 | 2/2016 |
| GB | 2213882 A | 8/1989 |
| GB | 2554688 A | 4/2018 |
| JP | 2011007272 A | 1/2011 |
| JP | 2012081891 A | 4/2012 |
| JP | 2016014446 A | 1/2016 |
| JP | 2017053368 A | 3/2017 |
| WO | 2018185288 A1 | 10/2018 |

* cited by examiner

SLEWING BEARING WITH SEALING ARRANGEMENT

CROSS-REFERENCE

This application claims priority to German patent application no. 102018206244.7 filed on Apr. 24, 2018, the contents of which are fully incorporated herein by reference.

TECHNOLOGICAL FIELD

The invention relates to the field of roller bearings. More particularly, the invention relates to the slewing bearings of large diameter for use in marine applications, for example a tidal power station.

BACKGROUND

Such bearings generally comprise an inner ring, an outer ring, and seals disposed between the rings to define a closed annular space within which at least one row of rolling elements, such as balls or rollers, is arranged between the rings.

Slewing bearings are used in aggressive environments, in particular in marine applications. Seals prevent exterior elements, such as dust, abrasive particles, water, and marine species, for example plankton and algae, from getting inside the bearing and damaging its components. Particles may also go inside the seal itself, and then reduce the seal service life.

Typically, seals are fixed to one of the rings and comprise a sealing lip in sliding contact with the other ring. Generally, a plurality of adjacent seals are provided on bearing front side that is directly in contact with water. Advantageously, the lips of adjacent seals may be oriented in different directions.

However, the sealing of such bearings, realized in this way, may be insufficient particularly for use in a submersible machine. Indeed, the first seal is only the first damaged before the others. The more seals, the more expensive the slewing bearing. The total weight of such sealed bearings is increased, that could be a drawback for some applications.

Another disadvantage is that the seal cannot be changed under water. Such maintenance operations are expensive and require the submersible machine to be shut down frequently and for a long period of time.

It is therefore desirable that a slewing bearing comprises effective sealing elements that prevent the entry of exterior element, of increased service life, particularly in aggressive environment, and easy to implement.

SUMMARY

The aim of the invention is to solve the above difficulties.

To this end, the invention relates to a slewing bearing comprising a first ring, a second ring, the rings being in relative rotation around a rotation axis, and at least one row of rolling elements arranged between the rings, the second ring having an axially extending radial surface.

According to the invention, the slewing bearing is further provided with a sealing device. The sealing device comprises at least one seal having an annular heel fixed to the first ring, and a sealing lip in sliding frictional contact with the second ring. The sealing device further comprises a deflector mounted to a lateral surface of second ring and having a deflecting part that at least partially radially surrounds the sealing lip.

According to further aspects of the invention which are advantageous but not compulsory, such a slewing bearing may incorporate one or several of the following features:

The heel is fixed into a slot formed on a frontal surface of the first ring.

The sealing device comprises an annular cap fixed to a lateral surface of first ring and blocking the seal heel in an upwards direction.

The first ring comprises an annular shoulder to block the seal heel in a downwards direction.

The deflecting part extends in close vicinity to one of the first ring or the cap.

The second ring is provided with a tubular element having a peripheral surface onto which the sealing lip is in sliding frictional contact, the tubular element being fixed to a lateral surface of second ring.

The deflector is fixed to a lateral surface of tubular element.

The tubular element is fixed to the second ring by a plurality of screws, screws being covered by deflector.

The deflector is fixed to the second ring by a plurality of screws.

The cap is fixed to the first ring by a plurality of screws.

Screws are covered by mastic.

The deflector is annular.

The deflector comprises a plurality of circumferentially adjacent deflector parts.

The cap is annular.

The cap comprises a plurality of circumferentially adjacent cap parts.

The deflector is made of Polyether ether ketone (PEEK).

The slewing bearing comprise seals that define between the rings a closed annular chamber within which the rolling elements are arranged.

The closed annular chamber is provided with lubricant.

The first ring is an inner ring and the second ring is an outer ring.

Slewing bearing comprises at least one row of rolling elements arranged between the first and second rings to form an axial thrust.

Slewing bearing comprises at least one row of rolling elements arranged between the first and second rings to form a radial thrust.

Rolling elements are balls.

Rolling elements are rollers.

Rolling elements are circumferentially maintained by a cage.

Rolling elements are circumferentially maintained by spacers.

BRIEF DESCRIPTION OF THE DRAWINGS

The invention will now be explained in correspondence with the annexed figures, as illustrative examples, without restricting the object of the invention. In the annexed figures.

DETAILED DESCRIPTION

Figure 1:
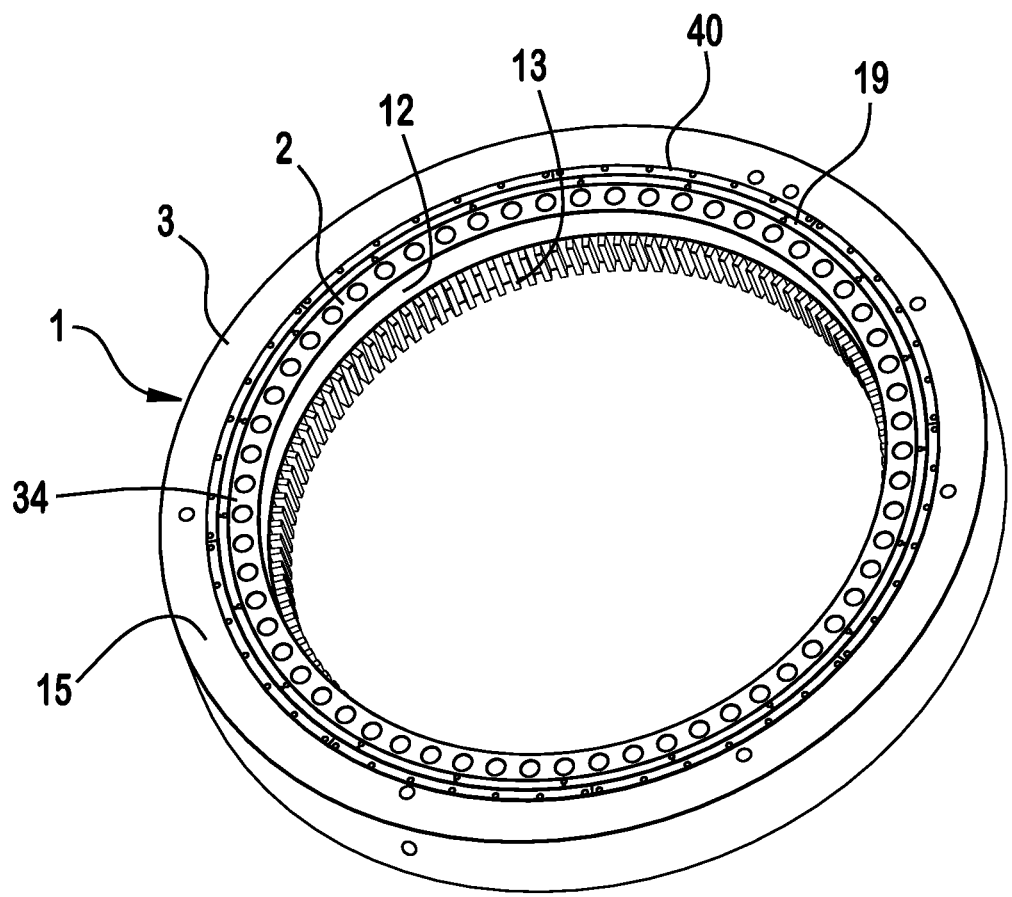
FIG. 1 is a partial perspective view of a slewing bearing according to a first embodiment of the invention.
Figure 2:
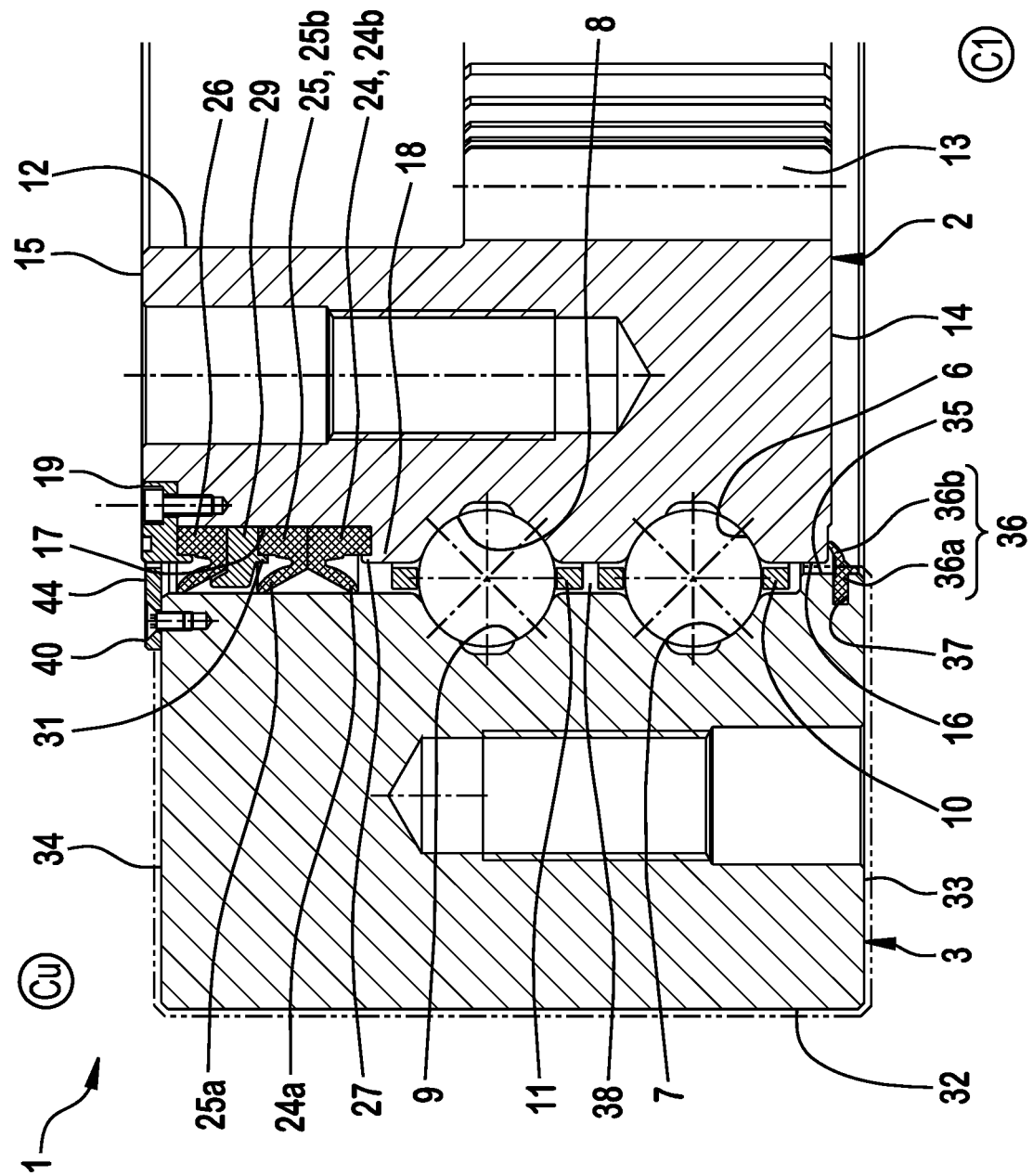
FIG. 2 is a partial view in axial section of the slewing bearing of FIG. 1.

FIGS. 1 and 2 show a slewing roller bearing, which bears the overall reference 1, with a large diameter which can be used in particular in marine applications, for example a tidal power station. The slewing bearing defines an upper side Cu directly exposed to the marine environment, and a lower side Cl arranged in a chassis (not illustrated).

The slewing roller bearing 1 comprises an inner ring 2, an outer ring 3, two rows of rolling elements 4, 5 arranged between these rings 2, 3 in order to form a radial thrust which can transmit radial forces.

The rolling elements 4, 5 are balls in the illustrated embodiment. The rolling elements may be of any other suitable type for the application, for example rollers. The first row of balls 4 are engaged in ring raceways 6, 7 provided on inner ring 2 and outer ring 3, respectively. The second row of balls 5 are engaged in ring raceways 8, 9 provided on inner ring 2 and outer ring 3, respectively.

The balls 4 of first row are arranged in a first cage 10 for maintaining the regular circumferential spacing of the balls. The balls 5 of second row are arranged in a second cage 11 for maintaining the regular circumferential spacing of the balls. Alternatively, the rolling elements may be circumferentially equally spaced by a plurality of intermediate spacers.

As an alternate not shown, the slewing bearing may also comprise at least one row of rolling elements, for example rollers, arranged between the inner and outer rings to form an axial thrust which can transmit axial forces. An example of such bearing is described in FR-A1-2 694 610.

The inner ring 2 and the outer ring 3 are in the form of concentric rings being rotatable around a rotation axis (not illustrated) of the bearing 1, the outer ring 3 surrounding at a radial distance the inner ring 2.

The rings 2, 3 are of solid type. A "solid type" is understood to mean a ring of which the shape is obtained by machining with the removal of chips (turning, grinding) from tubes, bars, and forged and/or rolled blanks. The rings 2, 3 are form in one piece, but alternatively may comprise several ring parts assembled together.

The outer ring 3 comprises an outer frontal surface 32 bounded axially by a lower lateral surface 33 on lower side Cl, and an upper lateral surface 34 on upper side Cu of slewing bearing 1. The lateral surfaces 33, 34 are axially opposite one to the other. The outer ring 3 also comprises a bore 35 which, when viewed in a cross-section in which lies the rotation axis, is defined by an axially extending radial surface. The bore 35 is stepped and is provided with two grooves 7, 9 radially open to the inner ring 2 are formed. The grooves 7, 9 are the ring raceways for the first row of balls 4 and the second row of balls 5, respectively.

Advantageously, the outer surfaces 32, 33, 34 of outer ring 3 are covered by a corrosion surface protective treatment.

The inner ring 2 comprises a bore 12 provided with a plurality of radial teeth 13 that are intended to mesh with gearwheels (not illustrated) in order to orient a mobile element. The bore 12 is bounded axially by a lower lateral surface 14 on lower side Cl, and an upper lateral surface 15 on upper side Cu of slewing bearing 1. The lateral surfaces 14, 15 are axially opposite one to the other.

The inner ring 2 also comprises an outer frontal surface 16. The outer surface 16 is stepped and is provided with two grooves 6, 8 radially open to the outer ring 3 are formed. The grooves 6, 8 are the ring raceways for the first row of balls 4 and the second row of balls 5, respectively.

The outer frontal surface 16 is further provided with a circumferential groove 17 open radially towards the outer ring 3. The groove is axially bounded between a shoulder 18 towards the lower side Cl, and a cap 19 towards the upper side Cu of bearing 1. The shoulder 18 is formed when removing material on the outer frontal surface 16 of inner ring 2.

The cap 19 is fixed to the inner ring 2 by fixing means. Upper lateral surface 15 is provided with a circumferential recess 20 wherein the cap 19 is arranged. In the illustrated embodiment, the circumferential recess 20 is provided circumferentially with a plurality of axial threaded holes 21. The cap 19 is provided with a plurality of axial through holes 22, each of the holes 22 axially facing a corresponding threaded hole 21. The cap 19 is fixed to the inner ring 2 by a plurality of screws 23 extending through the cap holes 22 and engaged with the threaded holes 21 of inner ring 2. Advantageously, the heads of screws 23 are covered by mastic in order to resist to the subsea environment.

Alternatively, the cap 19 may be fixed to the inner ring 2 by any other suitable means. Alternatively, the inner ring 2 and the cap 19 may be formed integral, the circumferential groove 17 being a circumferential slot.

In the illustrated embodiment of FIG. 1, the cap 19 is annular. Alternatively, the cap 19 comprises a plurality of circumferentially adjacent cap parts.

Upper seals 24, 25, 26 are mounted in the circumferential groove 17. In the illustrated embodiment of FIG. 2, the inner ring 2 is provided with three upper seals. Alternatively, the inner ring 2 may comprise one, two, or more than three upper seals. The seals 24, 25, 26 may be made of elastomeric material, for example nitrile rubber. The seals 24, 25, 26 are intended to limit the infiltration of liquids, particles and dust from the subsea environment between the inner ring 2 and the outer ring 3.

Upper seals 24, 25, 26 are each provided with an annular heel 24a, 25a, 26a mounted in the groove 17, and a sealing lip 24b, 25b, 26b that radially outwardly extends from the heel towards the outer ring 3.

The shoulder 18 is provided with an annular axial collar 27 that radially block the annular heel 24a of a first upper seal 24 in a radially outwards direction. The cap 19 is also provided with an annular axial collar 28 that radially block the annular heel 26a of a third upper seal 26 in a radially outwards direction.

The sealing lips 24b, 25b, 26b project radially outwardly offset with respect to the outer frontal surface 16 of inner ring 2 in which the circumferential groove 17 is formed. Furthermore, the sealing lips 24b, 25b, 26b project radially outwardly offset with respect to the cap 19. The sealing lips 24b, 25b, 26b are flexible in the radial direction. Advantageously, the sealing lip 24b, 25b, 26b extends obliquely with respect to a radial plane. Advantageously, the first upper seal 24 is provided with a sealing lip 24b that is oriented opposite to that of the other seals 25, 26.

Advantageously, a guiding ring 29 may be arranged in the circumferential groove 17 and between the first and second upper seals 24, 25. The guiding ring 29 comprises a flange 30 that radially outwardly projects towards the outer ring 3. The flange 30 extends obliquely in the same direction as the sealing lip 26b of the third upper seal 26 in order to prevent any reversion of the sealing lip 26. The guiding ring further comprises an annular axial collar 31 that radially block the annular heel 25a of a second upper seal 25 in a radial outwards direction.

The sealing lips provide a dynamic sealing function with the outer ring 3. The expression "dynamic sealing" is understood to mean sealing between two parts that move relative to the other. The lips 24b, 25b, 26b come into sliding frictional contact with the bore 35 of outer ring 3. The lips thus have an area of contact with the bore 35 of outer ring 3. The frictional contact between the lips 26 and the bore 35 of outer ring 3 is radial. The free ends of lips 26 advantageously have a triangular shape in cross section in order to limit the friction between the seals 24 and the outer ring 3.

The slewing bearing 1 further comprises an inner seal 36 on inner side Ci. The inner seal 36 is axially opposite to upper seals 24, 25, 26. The inner seal 36 comprises an annular heel 36a mounted in an annular slot 37 formed in the bore 35 of outer ring 3, and a sealing lip 36b projecting radially inwardly towards the inner ring 2. The sealing lip 36b has a free end in sliding frictional contact with lower lateral surface 14 of inner ring 2. The contact between the sealing lip 36b and the inner ring 2 is axial in this case.

The upper seals 24, 25, 26 and the lower seal 26 define an annular closed chamber 38 between the inner ring 2 and the outer ring 3 within which the rows of balls 4, 5 are arranged. Advantageously, the closed annular chamber 38 is provided with lubricant. The closed annular chamber 38 is protected by the seals from the intrusion of external contaminating particles, dust, and liquids.

According to the invention, the outer ring 3 is further provided with a deflector 40 to improve the seal of slewing bearing 1.

Advantageously, the deflector 40 is made of Polyether ether ketone (PEEK). This material is particularly adapted to resist to water sea characteristics, and to subsea species.

The deflector 40 is fixed to the upper lateral surface 34 of upper ring 3. In the illustrated embodiment, the upper lateral surface 34 is provided circumferentially with a plurality of axial threaded holes 41. The deflector 40 is provided with a plurality of axial through holes 42, each of the holes 42 axially facing a corresponding threaded hole 41. The deflector 40 is fixed to the outer ring 3 by a plurality of screws 43 extending through the deflector holes 42 and engaged with the threaded holes 41 of outer ring 3. Advantageously, the heads of screws 43 are covered by mastic in order to resist to the subsea environment. Alternatively, the deflector 40 may be fixed to the outer ring 3 by any other suitable means.

The deflector 40 is offset axially towards the upper side Cu with respect to the upper seals 24, 25, 26, and more particularly to their sealing lips 24b, 25b, 26b.

The deflector 40 comprises an annular deflecting part 44 that projects radially inwardly offset with respect to the bore 35 of outer ring 3. The deflecting part 44 extends radially inwardly in close vicinity to the cap 19 fixed to inner ring 2. The deflecting part 44 entirely radially surrounds the sealing lips 24b, 25b 26b.

Alternatively, the deflecting part 44 only partly surrounds the sealing lips 24b, 25b, 26b, and more particularly their free ends in sliding frictional contact with the bore 35 of outer ring 3.

The deflecting part 44 provides a dynamic sealing function with the inner ring 2. The deflecting part 44 forms a narrow-passage seal with the cap 19. The narrow passage between the deflector 40 and the cap 19 is radial in this case. The deflecting part 44 surrounds the sealing lip 26b of third upper seal 26 and forms a prior seal upstream of the lip. This makes it possible to reduce the number of contaminating particles that infiltrate towards and reach the lip 26b. The deflector 40 forms an obstacle preventing flow carrying contaminating pollution from reaching the lip 26b.

Figure 3:
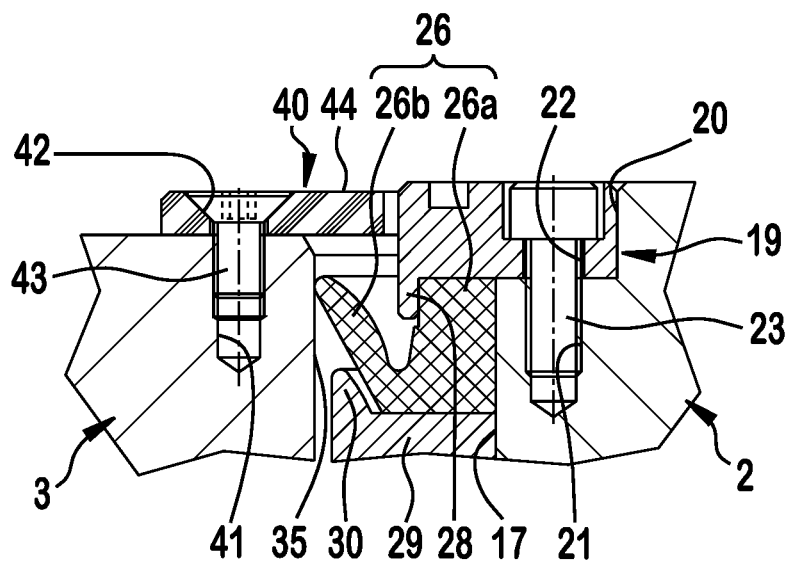
FIG. 3 is an enlarged view in axial section of the slewing bearing of FIG. 2.

In the illustrated embodiment of FIG. 3, the deflector 40 comprises a plurality of circumferentially adjacent deflector parts. Alternatively, the deflector 40 is annular.

Alternatively, the deflector and/or the upper seals may provide a dynamic sealing function with a frame or housing.

Figure 4:
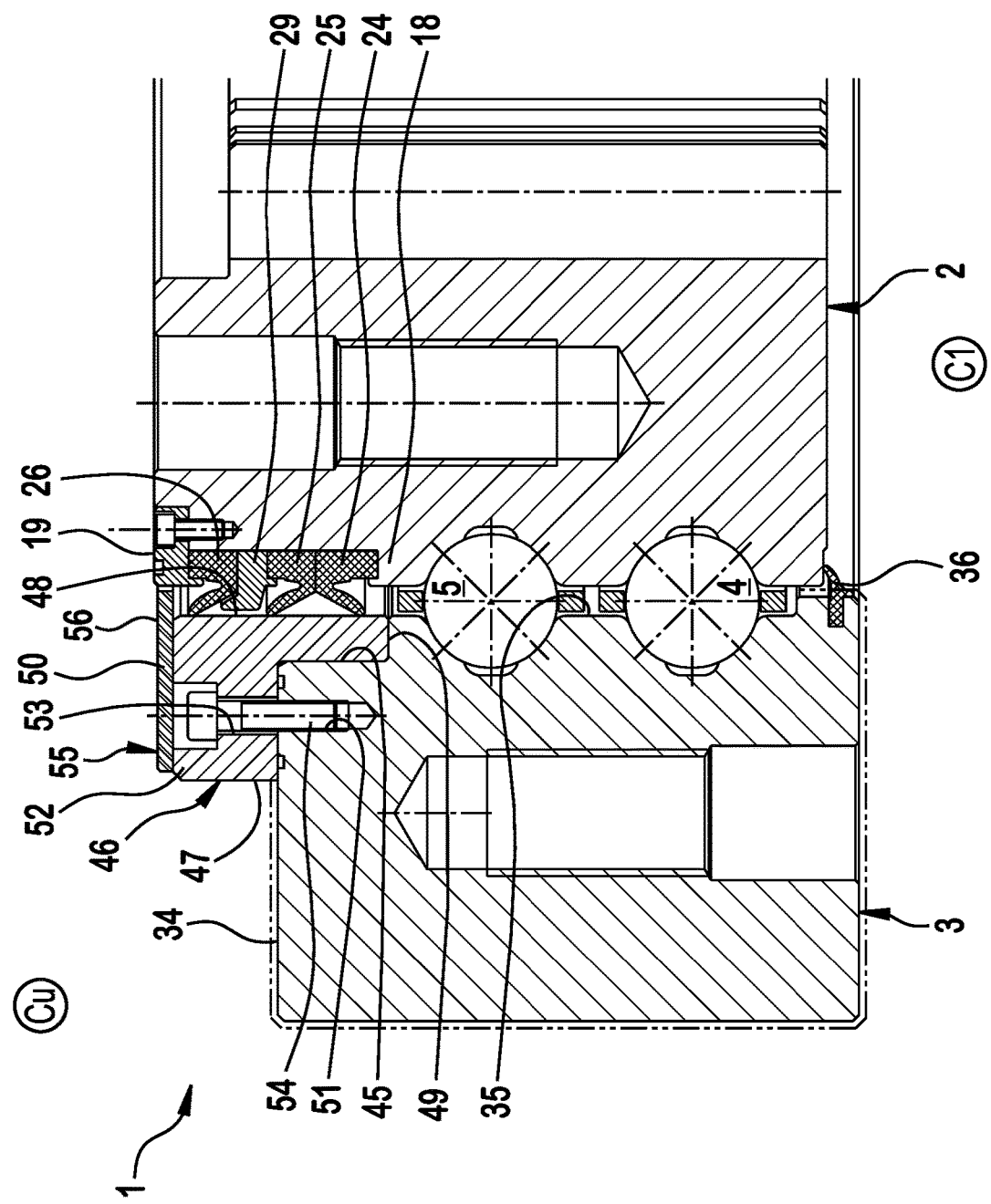
FIG. 4 is a partial view in axial section of a slewing bearing according to a second embodiment of the invention.

A second embodiment of the invention is illustrated in FIG. 4, wherein the same elements have the same references.

The bore 35 of outer ring 3 is provided with a circumferential groove 45 open radially inwardly to the inner ring 2, and also open axially upwardly. A tubular element 46 is mounted in the circumferential groove 45. The tubular element has an outer cylindrical surface 47, a bore 48, and is bounded axially between a lower lateral surface 49 and an upper lateral surface 50.

The upper lateral surface 50 of tubular element 46 is upwardly axially offset with respect to the upper lateral surface 34 of outer ring 3. The bore 48 of tubular element 46 is axially aligned with the bore 35 of outer ring 3.

The tubular element 46 is fixed to the upper lateral surface 34 of upper ring 3. In the illustrated embodiment, the upper lateral surface 34 is provided circumferentially with a plurality of axial threaded holes 51. The tubular element is provided with an outer part 52 which is provided with a plurality of axial through holes 53, each of the holes 53 axially facing a corresponding threaded hole 51. The outer part 52 of tubular element 46 is fixed to the outer ring 3 by a plurality of screws 54 extending through the holes 53 and engaged with the threaded holes 51 of outer ring 3. Alternatively, the deflector 40 may be fixed to the outer ring 3 by any other suitable means.

A deflector 55 is mounted onto the upper lateral surface 50 of tubular element 46. The deflector 55 is fixed to the tubular element by any appropriate means, for example by screws (not illustrated in this axial section). The deflector 55 covers the screws 54 that fix the tubular element 46 to the outer ring 3.

The deflector 55 is offset axially towards the upper side Cu with respect to the upper seals 24, 25, 26, and more particularly to their sealing lips 24b, 25b, 26b.

The deflector 55 comprises an annular deflecting part 56 that projects radially inwardly offset with respect to the bore 48 of tubular element 46. The deflecting part 56 extends radially inwardly in close vicinity to the cap 19 fixed to inner ring 2. The deflecting part 56 entirely radially surrounds the sealing lips of upper seals 24, 25, 26.

The deflecting part 56 provides a dynamic sealing function with the inner ring 2. The deflecting part 56 forms a narrow-passage seal with the cap 19.

This invention provides a slewing bearing that is able to ensure the relative rotation between a first ring and a second ring, the bearing having improved sealing by virtue of the use of sealing means comprising the upper seals mounted on the first ring and the deflector mounted on the second ring. Such sealing means are able to seal the space between the first and second rings by sliding frictional seal and a narrow-passage seal in order to limit the intrusion of contaminating particles and liquids in the direction of rolling elements.

What is claimed is:
1. A slewing bearing comprising:
a first ring,
a second ring, the first and second rings being in relative rotation around a rotation axis, and at least one row of rolling elements arranged between the first and second rings, the second ring having an axially extending radial surface, the slewing bearing further provided with a sealing device comprising:
at least one seal having an annular heel fixed to the first ring, and a sealing lip in sliding frictional contact with the second ring, the sealing lip extends radially outwardly from the annular heel and also extends axially away from the at least one row of rolling elements, the sealing lip contacts the axially extending radial surface of the second ring,
  a deflector mounted to a lateral surface of second ring and having a deflecting part that at least partially radially overlaps the sealing lip, the annular heel having an axial heel end which faces away from the deflector,
  wherein the sealing lip is in facing opposition to the deflector and the deflector is axially spaced from the sealing lip, and
a guiding ring located on the first ring and abutting the axial heel end of the at least one seal, the guiding ring, when viewed in cross section, has a flange which overlaps the sealing lip to facilitate reducing deflection of the sealing lip.

2. The slewing bearing according to claim 1, wherein the sealing device comprises an annular cap fixed to a lateral surface of the first ring and blocking the seal heel in an axial direction away from the at least one row of rolling elements.

3. The slewing bearing according to claim 1, wherein the first ring comprises an annular shoulder to block the seal heel in an axial direction towards the at least one row of rolling elements.

4. The slewing bearing according to claim 1, wherein the deflector is fixed to the second ring by a plurality of screws.

5. The slewing bearing according to claim 1, wherein the deflector is made of Polyether ether ketone (PEEK).

6. A slewing bearing comprising:
a first ring,
a second ring, the first and second rings being in relative rotation around a rotation axis, and at least one row of rolling elements arranged between the first and second rings, the slewing bearing further provided with a sealing device comprising:
  at least one seal having an annular heel fixed to the first ring, and a sealing lip in sliding frictional contact with the second ring,
  a deflector mounted to a lateral surface of second ring and having a deflecting part that at least partially radially overlaps the sealing lip, the annular heel having an axial heel end which faces away from the deflector,
  wherein the deflector is axially spaced from the sealing lip, wherein the deflecting part, in combination with an annular cap, forms a gap, and
a guiding ring located on the first ring and abutting the axial heel end of the at least one seal, the guiding ring, when viewed in cross section, has a flange which overlaps the sealing lip to facilitate reducing deflection of the sealing lip.

7. A slewing bearing comprising:
a first ring,
a second ring, the first and second rings being in relative rotation around a rotation axis, and at least one row of rolling elements arranged between the first and second rings, the slewing bearing further provided with a sealing device comprising:
  at least one seal having an annular heel fixed to the first ring, and a sealing lip in sliding frictional contact with the second ring, and
  a deflector mounted to a lateral surface of second ring and having a deflecting part that at least partially radially overlaps the sealing lip, wherein the sealing device comprises an annular cap fixed to a lateral surface of the first ring and blocking the seal heel in an axial direction away from the at least one row of rolling elements.

8. The slewing bearing according to claim 7, wherein the deflecting part, in combination with the annular cap, forms a gap.

9. The slewing bearing according to claim 7, wherein the first ring comprises an annular shoulder to block the seal heel in an axial direction towards the at least one row of rolling elements.

10. The slewing bearing according to claim 7, wherein the deflector is fixed to the second ring by a plurality of screws.

11. The slewing bearing according to claim 7, wherein the second ring is provided with a tubular element having a peripheral surface onto which the sealing lip is in sliding frictional contact, the tubular element being fixed to a lateral surface of second ring.

12. The slewing bearing according to claim 11, wherein the deflector is fixed to a lateral surface of tubular element.

13. The slewing bearing according to claim 12, wherein the tubular element is fixed to the second ring by a plurality of screws, the screws being covered by the deflector.

14. The slewing bearing according to claim 7, wherein the deflector is made of Polyether ether ketone (PEEK).

15. A slewing bearing comprising:
a first ring,
a second ring, the first and second rings being in relative rotation around a rotation axis, and at least one row of rolling elements arranged between the first and second rings, the slewing bearing further provided with a sealing device comprising:
  at least one seal having an annular heel fixed to the first ring, and a sealing lip in sliding frictional contact with the second ring, and
  a deflector mounted to a lateral surface of second ring and having a deflecting part that at least partially radially overlaps the sealing lip,
wherein the second ring is provided with a tubular element having a peripheral surface onto which the sealing lip is in sliding frictional contact, the tubular element being fixed to a lateral surface of second ring,
wherein the deflector is fixed to a lateral surface of tubular element, and
wherein the tubular element is fixed to the second ring by a plurality of screws, the screws being covered by the deflector.

* * * * *